May 4, 1965

J. DOLZA 3,181,519

FUEL CONTROL

Filed June 14, 1956

INVENTOR
John Dolza
BY
L. D. Burch
ATTORNEY

May 4, 1965 J. DOLZA 3,181,519
FUEL CONTROL
Filed June 14, 1956 3 Sheets-Sheet 2

INVENTOR
John Dolza
BY
L. D. Burch
ATTORNEY

May 4, 1965
J. DOLZA
3,181,519
FUEL CONTROL
Filed June 14, 1956
3 Sheets-Sheet 3
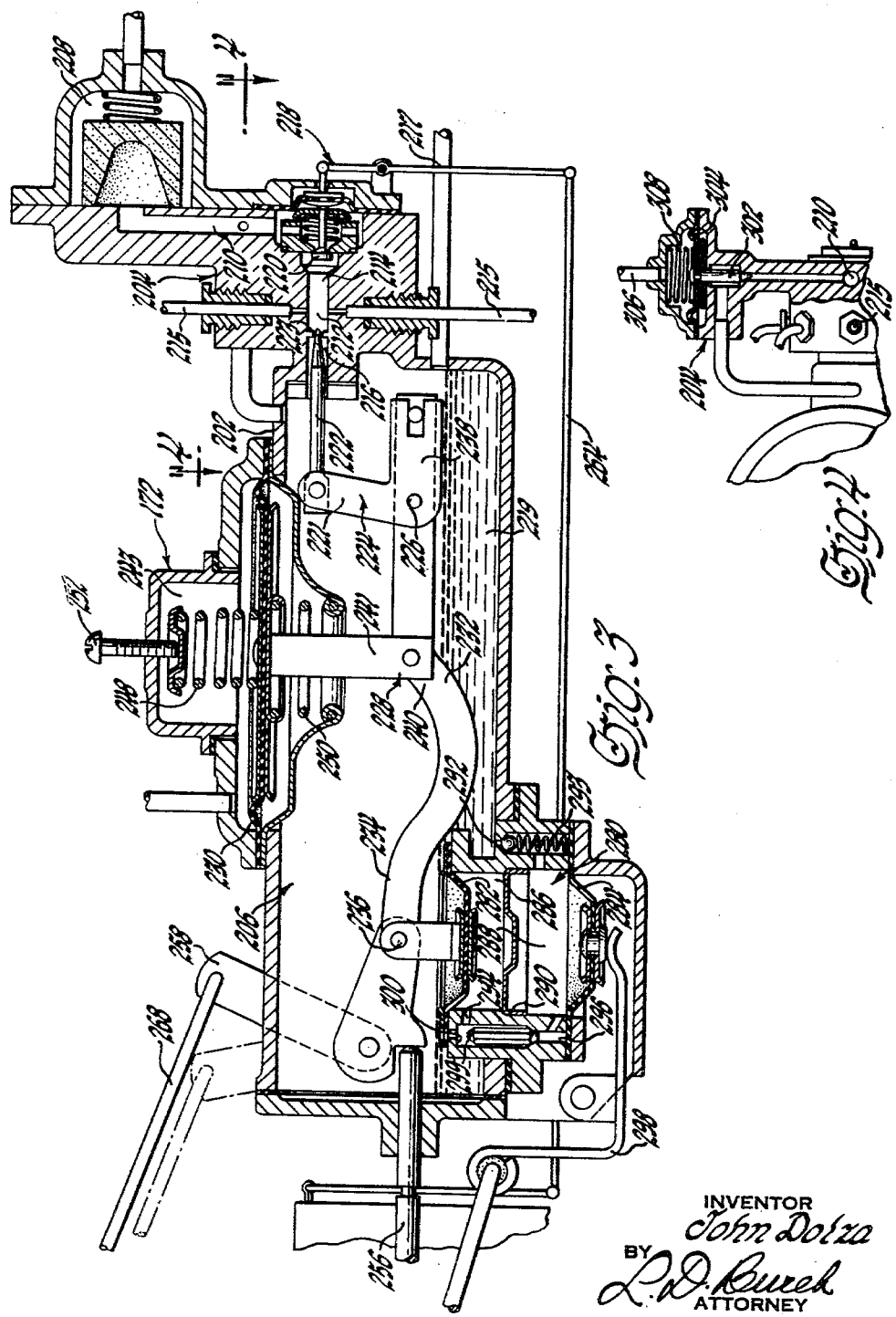
INVENTOR
John Dolza
BY
L.D. Burch
ATTORNEY

United States Patent Office 3,181,519
Patented May 4, 1965

3,181,519
FUEL CONTROL
John Dolza, Fenton, Mich., assignor to General Motors
Corporation, Detroit, Mich., a corporation of Delaware
Filed June 14, 1956, Ser. No. 591,450
46 Claims. (Cl. 123—119)

The present invention relates to internal combustion engines and more particularly to charge forming means therefor.

In the operation of a so-called spark ignited, internal combustion engine, a combustible charge of air and atomized fuel is compressed and ignited in the engine cylinders. In order to obtain the maximum performance and economy from such an engine, it is essential that the charge of air and fuel be accurately metered and that each of the engine cylinders obtain substantially identical charges both as to volume and proportions. In the past the charge has usually been formed in one or more carburetors and distributed to the various cylinders by means of an intake manifold. Although such arrangements have been satisfactory in the past, they have certain inherent characteristics that limit the maximum output of a high performance engine. During certain operating conditions these limitations become very apparent and a considerable amount of difficulty may be experienced during such operation. For example, during large air flows the atomized fuel tends to centrifugally separate from the charge with some of the cylinders obtaining a richer mixture than other cylinders and also some of the cylinders receiving a considerably larger charge. Also the passages in the carburetor and complex manifolding present sufficient resistance to the flow of the charge to decrease the volumetric efficiency and the output of the engine. In order to overcome these limitations a tremendous amount of time and effort has been expended to develop a means of injecting metered fuel directly into the induction air. Such an arrangement cannot only eliminate the flow restrictions in the induction passages in the intake manifolds, etc., but also permit a more uniform distribution of the fuel and air to the cylinders with corresponding increases in the output and economy of the engine. However, in spite of all these potential advantages, so far nobody has been able to develop a simple fuel injection system adapted specifically for use on mass produced automobiles. Heretofore, all of the fuel injection systems that have been proposed have been very complicated and therefore too expensive and unreliable for use on mass produced automotive vehicles. In addition, the previous systems have not been capable of accurately metering the engine fuel requirements over the wide range of operating conditions encountered in an automotive engine and accordingly, the use of these systems has been limited to special applications.

It is now proposed to provide a simple fuel injection system adapted for economical production for use on mass produced automobiles. This system has been simplified by employing a minimum number of moving parts; however, the system will still accurately meter all of the fuel requirements during all engine operating conditions and inject this metered fuel in equal increments into the charges for the cylinders. The system basically includes a metering pump and a distributor having a by-pass valve therein and is connected to the pump outlet. The metering pump is preferably a positive displacement pump driven by the engine with an output proportional to the speed of the engine with the output being in excess of the fuel requirements of the engine. The distributor receives the entire amount of fuel discharged from the metering pump and distributes equal increments of a portion of this fuel to the engine cylinders. The by-pass valve which communicates with the distributor is responsive to the pressure of the air flowing into the engine and is effective to meter the fuel distributed to the cylinders by by-passing the surplus fuel from the distributor. Although such an arrangement has been found satisfactory for accurately metering the fuel during normal engine operating conditions, during certain operating conditions it may be desirable to temporarily vary the air-fuel ratio from that which would otherwise be produced by the basic systems. For example, during the initial starting operations, operation at subnormal engine temperatures, acceleration and maximum power operation, etc., it may be desirable to enrichen the mixture. Accordingly, means may be provided for modifying the normal metering action of the by-pass valve and/or for supplementing the metering pump and directing additional quantities of fuel into the distributor.

In order to obtain maximum performance from an internal combustion engine it is desirable to charge each of the cylinders with as much air and fuel as possible during each cycle. A very effective method for increasing the volume of the charge delivered to the cylinders is to tune the intake passages or provide so-called "ram pipes" which will resonate during certain engine operating conditions. During these resonant conditions the charge flowing through the "ram pipes" will acquire sufficient velocity to be "rammed" into the cylinders when the intake valves open and thereby dynamically supercharge the cylinders. However in the past, when employing an induction system incorporating tuned intake passages, it has been found extremely difficult to accurately throttle the air and meter the fuel while maintaining a uniform distribution of the charge to the various cylinders. This is particularly true during resonance conditions when there is a violent surging of air through the ram pipes. It is now proposed to provide an engine induction system having a plurality of "ram pipes" in combination with a fuel system adapted to positively inject metered quantities of fuel into the charge as it flows through the ram pipes. The induction system includes a plenum chamber having a throttled inlet with the ram pipes interconnecting the chamber with the cylinders. Thus it may be seen that since the ram pipes draw only throttled air from the plenum chamber, the air flow may be easily and accurately throttled with each of the cylinders receiving identical amounts of the charge, and, by injecting the fuel into the charge adjacent the intake valves, each cylinder will receive identical quantities.

In order to meter the fuel in proportion to the fuel demands of the engine, a fuel metering pump may be provided that is driven by the engine so as to have an output proportional to the speed of the engine and a combination distributor-by-pass valve that is responsive to the pressure of the air flowing through the induction system to the cylinders and by-passes surplus fuel to the pump intake in response to the air pressure while the remaining metered fuel flows to the cylinders. Normally the air pressure in the plenum chamber will be indicative of the amount of air flow into the cylinders. However, when the ram pipes resonate there will be a violent surging of air in the pipes and the air pressure in the plenum chamber will not accurately reflect the amount of air flow into the cylinders during this resonating condition. As a result, it has been found difficult to accurately meter the fuel in terms of the air pressure in the plenum chamber.

Accordingly, it is now proposed to measure the amount of air flow by sensing the air pressures in the intake passages adjacent the intake valves, as this will be an accurate index of the amount of air flow into the cylinders during all operating conditions including during resonance conditions. Although this air pressure may be obtained in numerous ways, it is proposed to provide a sampling valve that "samples" the air pressures in each of the intake passages immediately adjacent the intake valves. The sampling valve obtains sample pressures from one or more of the intake passages during corresponding portions of the cycles for the adjacent cylinders. These pressures are then combined with each other to produce a resultant signal that represents the average of the various individual pressures. This resultant signal is then transferred to the control for the by-pass valve which in turn regulates the amount of fuel by-passed and consequently meters the fuel in proportion to the air flow. It should be noted that by measuring the air pressure immediately adjacent the intake valve rather than in the plenum chamber, it is possible to more accurately sense the amount of air flow and meter the fuel in proportion thereto even during resonant conditions.

In the three sheets of drawings:

FIGURE 3 is a cross sectional view, on an enlarged scale, of the control unit employed in the system in FIGURE 2.

FIGURE 4 is a fragmentary side view of the control unit showing the distributor and fuel cut-off device employed therein.

Figure 1:
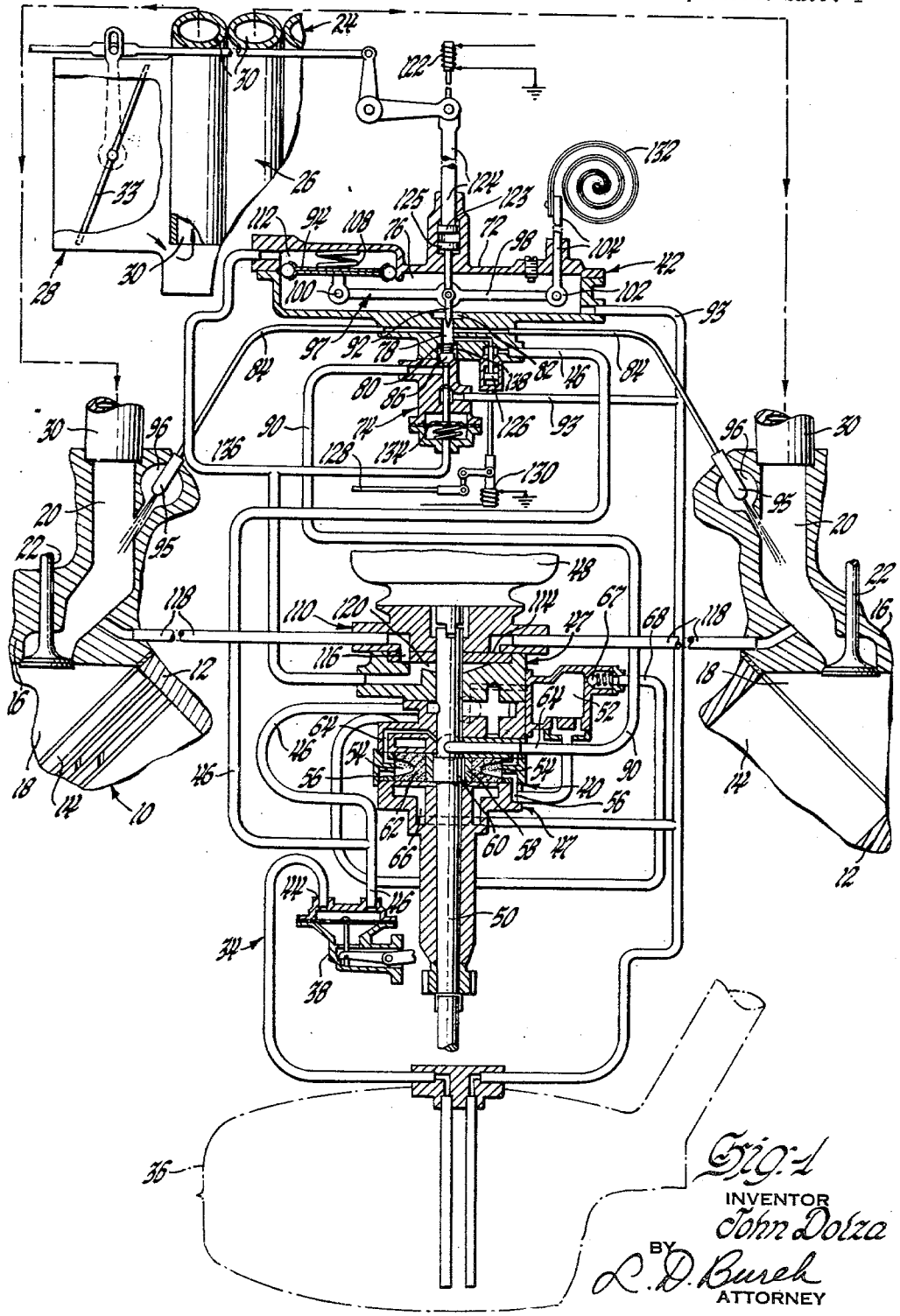
FIGURE 1 is a diagrammatic view of a fuel injection system embodying the present invention and adapted for use on an internal combustion engine.

The present invention may be adapted for use in any suitable engine such as a so-called V-type engine 10 wherein a cylinder block 12 includes a pair of angularly disposed banks of cylinders 14 with cylinder heads 16 secured to the block 12 to close the ends of the cylinders 14 and form combustion chambers 18. The cylinders 14 may be charged by intake passages 20 that extend through the heads 16 with the inner ends thereof forming openings in the walls of the combustion chambers. Intake valves 22 may seat in these openings for controlling the flow of the charge into the combustion chambers 18. These valves 22 may be actuated by cams on an engine camshaft (not shown) which in the case of a four cycle engine rotates at one-half engine speed.

In order to supply the air for the charge flowing through the intake passages 20 and into the cylinders 14, an air induction system 24 may be provided. This induction system 24 includes an enlarged plenum chamber 26 having an inlet 28 communicating with the atmosphere and a plurality of separate tubes or pipes 30 that interconnect the plenum chamber 26 with the individual cylinders 14 by way of the intake passages 20. These pipes 30 may extend from the plenum chamber 26 to the ends of the intake passages 20 in the cylinder heads 16. The plenum chamber 26 may contain a suitable air filter and be of a size and shape to silence the engine noises. In order to increase the power of the engine 10 it has been found desirable to tune these intake passages 20 and pipes 30 so that they will resonate during one or more engine operating conditions. During these conditions there will be violent surges of air through the intake passages that will cause the air to be "rammed" into the cylinders 14 and cause them to be dynamically supercharged.

The plenum chamber 26 should be of sufficient volume to allow the individual intake passages 20 to resonate without effecting the air flow in the plenum chamber 26 or the other intake passages 20. However, the volume of the plenum chamber 26 should not be unduly large as otherwise there may be a tendency for the air flow in the induction system 24 to become erratic at light loads and cause difficulties especially during idling.

A throttle valve 33 for controlling the speed of the engine 10 may be disposed in the inlet 28 to the plenum chamber 26 for regulating the amount of air flowing therethrough and into the engine 10. Thus it may be seen that a single throttle valve 33 is employed to regulate the air flow to all of the cylinders 14 and even though there are separate tuned intake passages 20 for each cylinder 14, each of the cylinders 14 will receive identical charges.

In order to form a combustible charge for the cylinders a fuel injection system 34 may be provided that injects or sprays fuel into the intake passages 20 to form the mixture of air and atomized fuel. This fuel system 34 includes a fuel storage tank 36, a fuel supply or transfer pump 38, an injector or metering pump 40 and a metering or control unit 42.

The fuel supply or transfer pump 38 has the inlet 44 thereof connected to the storage tank 36 and an outlet line 46 for discharging the fuel therefrom. Although this pump 38 may be of any desired type since it is only intended to supply a large volume of low pressure fuel, a diaphragm type of pump driven by a rocker arm has been found satisfactory.

The injector or metering pump 40 is preferably a positive displacement pump that will have an output which is directly proportional to the speed thereof. For example, a pump such as disclosed and claimed in U.S. Patent No. 2,974,599 granted John Dolza March 14, 1961, may be employed. In the present instance this pump 40 includes a stationary housing 47 that forms a part of or is mounted immediately below the ignition distributor 48. The driveshaft 50 for the ignition distributor 48 and the oil pump (not shown) may extend axially through the center of the pump housing 47 and thus drive the pump 40. This driveshaft 50 is preferably driven by the engine 10 from some source such as the camshaft and therefore its operation will be coordinated with the operation of the cylinders 14. The prsent pump housing 47 includes a separating chamber 52 connected to the outlet line 46 of the transfer pump 38 and a plurality of pumping cells 54 that have the inlets 56 therefore connected to the bottom of the separating chamber 52. The pumping cells 54 comprise cylinders that are disposed in a common plane and radiate from the shaft 50. A plunger 58 may be reciprocably disposed in each cylinder with the radially inner ends engaging a cam 60 on the shaft 50. The radially outer ends of the plungers engage resilient plugs 62 that are alternately expanded and compressed to draw fuel through the inlets 56 and expel it through the outlet 64.

It has been found desirable to make the volume of the separating chamber 52 sufficiently large to permit any vapor bubbles etc., in the fuel to rise to the top of the chamber 52. Thus, by drawing fuel from the bottom of the chamber 52 the pumping cells 54 will receive clear fuel. In addition, the transfer pump 38 preferably supplies the separating chamber 52 with a considerable surplus of fuel over the requirements of the metering pump 40. This surplus will not only insure a constant supply of fuel for the pumping cells 54 but may also be by-passed from the top of the separating chamber 52 and carry away any vapors present in the top thereof. This fuel may then pass through the cooling jacket 66 to cool the pumping cells 54. A pressure relief valve 67 may be provided in the outlet 68 from the chamber 52 to maintain a predetermined pressure in the chamber 52. This will not only reduce the likelihood of a vapor lock occurring in the pump and thus insure a positive supply of fuel at the cell inlets 56, but it will also permit a considerable pressure drop in the fuel as it leaves the separating chamber 52, thereby creating a refrigerating effect that may be utilized to increase the cooling of the pumping cells 54. It should be noted that the fuel pressure maintained in the separating chamber 52 by the check valve 67 should be less than the amount required to open the intake and exhaust valves for the pumping cells 54. Otherwise, the transfer pump 38 will force fuel to pass through the pumping cells 54 independently of the pumping action therein. It may thus be seen that since the metering pump 40 is a positive displacement pump and is driven by the engine 10, the volume of fuel pumped therefrom will be proportional to the speed of the engine 10.

The control unit 42 includes a housing 72 having a fuel section 74 in the bottom thereof and a linkage section 76 in the top thereof. The fuel section 74 has a distributing chamber 78 with the inlet 80 in the bottom and the outlet 82 in the top. A plurality of substantially identical injector lines 84 radiate from the middle of the chamber 78 to terminate adjacent the intake valves 22. A fuel line 90 may interconnect the outlet 64 of the metering pump 40 with the inlet 80 to the distributing chamber 78 so the entire output from the metering pump 40 will be delivered to the bottom of the chamber 78 and leave through the injector lines 84 or the outlet 82. The inlet 80 to the distributing chamber 78 includes a pressure check valve or a so-called "anti-percolation" valve 86. This is a spring biased one-way valve that is adapted to maintain some predetermined pressure in the fuel line 90 that will substantially eliminate the formation of vapors therein. In addition, in the event the engine 10 is hot and has been inoperative for some time, any vapors that may form in the injector lines 84 will be prevented from backing up into the fuel line 90 and metering pump 40. It has been found desirable to maintain the volume of the entire system and especially the distributing chamber 78 as small as possible to reduce the amount of vapors formed and to permit a rapid recharging of the system with fuel in the event any vapors do collect therein.

A by-pass or needle valve 92 may be disposed in the outlet at the top of the distributing chamber 78 to control the flow of fuel therethrough. This by-passed fuel will collect in the bottom of the linkage section 76 and drain through the spill fuel line 93. It may thus be seen that the entire output from the metering pump 40 will flow into the distributing chamber 78 and leave through the injector lines 84 and/or the by-pass valve 92, and the volume of metered fuel flowing through the injector lines 84 being regulated by the position of the needle valve 92.

Uniformity of distribution of fuel to the cylinders 14 is dependent upon symmetry of the injector lines 84 about the distributing chamber 78 and all of the nozzles 95 being identical. These nozzles 95 are substantially the same as disclosed and claimed in copending applications S.N. 512,170, Atmospheric Vent for Fuel Injection Nozzle, Dolza et al. and S.N. 512,175, Fuel Injection Nozzle, Homfeld et al. Each of these nozzles 95 includes a metering orifice from which a stream of fuel is discharged. The orifice is disposed in an envelope of atmospheric air supplied by the air galleries 96 and is aimed to direct a stream of fuel through a second orifice into the intake passage and toward the intake valve 22.

As previously stated the amount of metered fuel flowing through the injector lines 84 to the cylinders 14 is controlled by the position of the needle valve 92 which regulates the amount of fuel by-passed from the distributing chamber 78 and draining through the spill fuel line 93. Therefore, in order to properly meter the fuel, the position of the needle valve 92 is positioned by means responsive to the fuel demands of the engine. For example, since the amount of fuel supplied to the distributing chamber 78 is proportional to the speed of the engine 10, the portion of fuel by-passed through the needle valve 92 may be regulated by the density of the air entering the cylinders 14. Accordingly, the needle valve 92 may be operatively connected to a pressure diaphragm 94 sensitive to the induction air density by means of a linkage 97.

The present linkage 97 includes a floating beam 98 that has one end 100 connected to the diaphragm 94, another end 102 connected to the adjustable pivot 104 and the needle valve 92 attached to the center thereof. One side of this diaphragm 94 may be exposed to the atmospheric air pressure while the other side is exposed to the pressure of the air in the induction system 24. Thus, since the spring 108 opposes the air pressure, the diaphragm 94 will assume a position indicative of the air density. The position of the diaphragm 94 will then be transmitted to the needle valve 92 by the floating beam 98. It may thus be seen that the diaphragm 94 will cause the needle valve 92 to move in or out and respectively increase or decrease the amount of metered fuel distributed to the various cylinders 14. It may be necessary to tailor the contour of the needle so that the metering action will precisely match the fuel demands of the engine 10.

Normally the pressure of the air in the plenum chamber 26 may be employed as an index of the amount of air flowing through the engine 10 when the intake passages 20 are not tuned to resonate. However, when the intake passages 20 are tuned to resonate the pressure of the air in the plenum chamber 26 will be an inaccurate index of the air flow as it will not accurately reflect the resonance in the intake passages 20 when such a condition exists. Accordingly, it has been found desirable to expose the diaphragm 94 to an air pressure other than the pressure in the plenum chamber 26. For example, the pressure of the air in one or more of the intake passages 20 adjacent the intake valves 22 may be used. Although the air pressure from one passage 20 may be employed, it has been found desirable to employ a sampling valve 110 that selectively interconnects the diaphragm chamber 112 with all of the various intake passages 20 immediately adjacent the intake valves 22. The present sampling valve 110 includes a rotary disk 114 mounted on the driveshaft 50 and to rotate in timed relation with the cylinders 14. This rotating disk 114 has an aperture 116 therethrough which is positioned to successively register with the inner ends of the various sampling tubes 118 and interconnect them with the chamber 120 below the disk 114. Thus the resultant pressure in the chamber 120 will be a signal representing an average of the pressures in all of the intake passages 20. This pressure signal is then transmitted to the diaphragm chamber 112 to cause actuation of the needle valve 92. The size and angular disposition of the aperture 116 may be chosen to sample the air during any desired portions of the intake cycles; however, it is desirable that the aperture 116 be chosen to connect only one sampling tube 118 at a time with the chamber 120 and that this connection be made during similar portions of the cycle in each intake passage 20. Although this pressure sample may be taken during any portion of the cycle, the best results are obtained where the sample is taken at a time reflecting the surges of air flowing during resonant conditions. It will thus be seen that the diaphragm 94 will be exposed to a pressure signal that will always be an accurate index of the quantity of air consumed.

Although the foregoing system 34 is adequate to provide the desired air-fuel ratio over the entire range of engine loads, it has been found that when starting a cold engine 10, it is desirable to provide a considerably richer mixture than is provided by the normal metering mechanism. Accordingly, it is desirable to provide means that will supplement the normal metering action and tend to increase the flow of distributed fuel during the starting operation. Although there are several ways to increase this fuel flow, one simple way of increasing the flow is forcing the needle valve 92 farther into the opening than the diaphragm 94 does. Since the metering pump 40 always supplies considerably more fuel than is required by the engine 10, this will always increase the fuel flow to the cylinders 14. The position of the needle 92 may be controlled manually or by any other suitable means. However, since the demand for these excessive quantities of fuel only exist during the cranking operation, a solenoid 122 may be connected to the starter circuit. Thus when the operator starts the engine 10, the solenoid 122 will depress a plunger 124 which forces the upper end 125 of the needle 92 downwardly and closes the outlet 82. Thus the entire volume of fuel flowing from the metering pump 40 and into the distributing chamber 78 will be distributed to the various engine cylinders 14.

An an addition or as an alternative to enriching the charge by closing the needle valve 92, an additional quantity of fuel may be delivered to the distribution chamber 78. Accordingly, the output line 46 from the transfer pump 38 may include a valve 126 that is adapted to open and permit the fuel from the transfer pump 38 to by-pass the metering pump 40 and flow directly into the distributing chamber 78. This valve 126 may be actuated manually or by any automatic means such as a linkage 128 or a solenoid 130 connected to the starter. Thus when employing this arrangement during the cranking operation the transfer pump 38 in addition to charging the metering pump 40 will supply large quantities of unmetered fuel to the cylinders 14. This has an advantage over the first arrangement in that the large volume of fuel from the transfer pump 38 will very quickly charge the entire system with fuel and remove any vapors, etc. therefrom. This may be particularly important where difficulty is experienced in priming the metering pump 40 and/or the output from the metering pump 40 is very small as a result of the low cranking speeds. It should be understood that these cold start enrichment means may be used either separately or together.

As soon as the engine 10 has fired and is operating under its own power the large quantities of fuel required for starting are no longer desirable. However since the engine 10 will be operating at subnormal temperatures for at least a short interval after it has started it is desirable to supply a somewhat richer mixture during this warm-up period than is supplied for normal operation. Accordingly a device such as a thermostatic spring 132 responsive to the temperature of the engine 10 may be provided for modifying the action of the metering mechanism. In the present instance this spring 132 is connected to the adjustable pivot 104 connected to end 102 of the floating beam 98 to move it up and down and modify the metering action of the diaphragm 94. When the engine is cold, the spring 132 will lower the pivot 104 which in turn will force the needle 92 into the opening 82. Thus even though the diaphragm 94 will continue to function in the usual manner, the lowered needle valve 92 will cause a somewhat richer charge to be supplied to the engine 10. Of course, as the engine 10 approaches normal operating temperatures the spring 132 will relax and raise the pivot 104, thereby restoring the normal metering action of the by-pass valve 92.

Although a fuel injection system of this nature is sufficiently fast acting to substantially eliminate any time delay in the delivery of fuel to cylinders, on some engines 10 it is desirable to provide means for enriching the charge during acceleration. Here again an extra supply of fuel may be delivered to the distributing chamber 78 or the position of the needle valve 92 may be modified. In the present instance the latter arrangement has been found preferable. Accordingly, the plunger 124 controlled by the throttle linkage may be provided in the cylinder containing the upper end of needle valve 92. When the throttle 33 is suddenly opened the plunger 124 will move and the air pressure will bias the needle 92 toward the richer position and increase the amount of fuel distributed to the cylinders 14. However, since the air between the plungers 123 and 124 is free to gradually escape, the normal metering action will be completely maintained except during sudden opening movement of the throttle 33. Normal movements of the throttle 33 will not effect the normal metering action.

When the throttle valve 33 is suddenly closed the load will tend to drive or overrun the engine 10. This results in a very high intake vacuum that interferes with complete combustion of the fuel and also the fuel consumed performs no useful work in driving the load. Thus this fuel is wasted and tends to produce unburned hydrocarbons in the atmosphere. It is therefore highly desirable to eliminate this fuel flow during overrunning conditions. This may be accomplished by providing a diaphragm 134 which is exposed to air pressure in the air pressure line 136 and is operatively connected to the valve 87. During normal operation the spring 138 will insure proper operation of the anti-percolation valve. However, when the throttle 33 is closed and the engine 10 is being driven by the load, the intake vacuum will be extremely high. During these conditions the vacuum will cause the diaphragm 134 to pull the valve 87 open. This will then cause the fuel to flow from the metering pump 40 into the spill fuel line 93 for return to the storage tank, thereby preventing the fuel from entering the distributing chamber 78.

Figure 2:
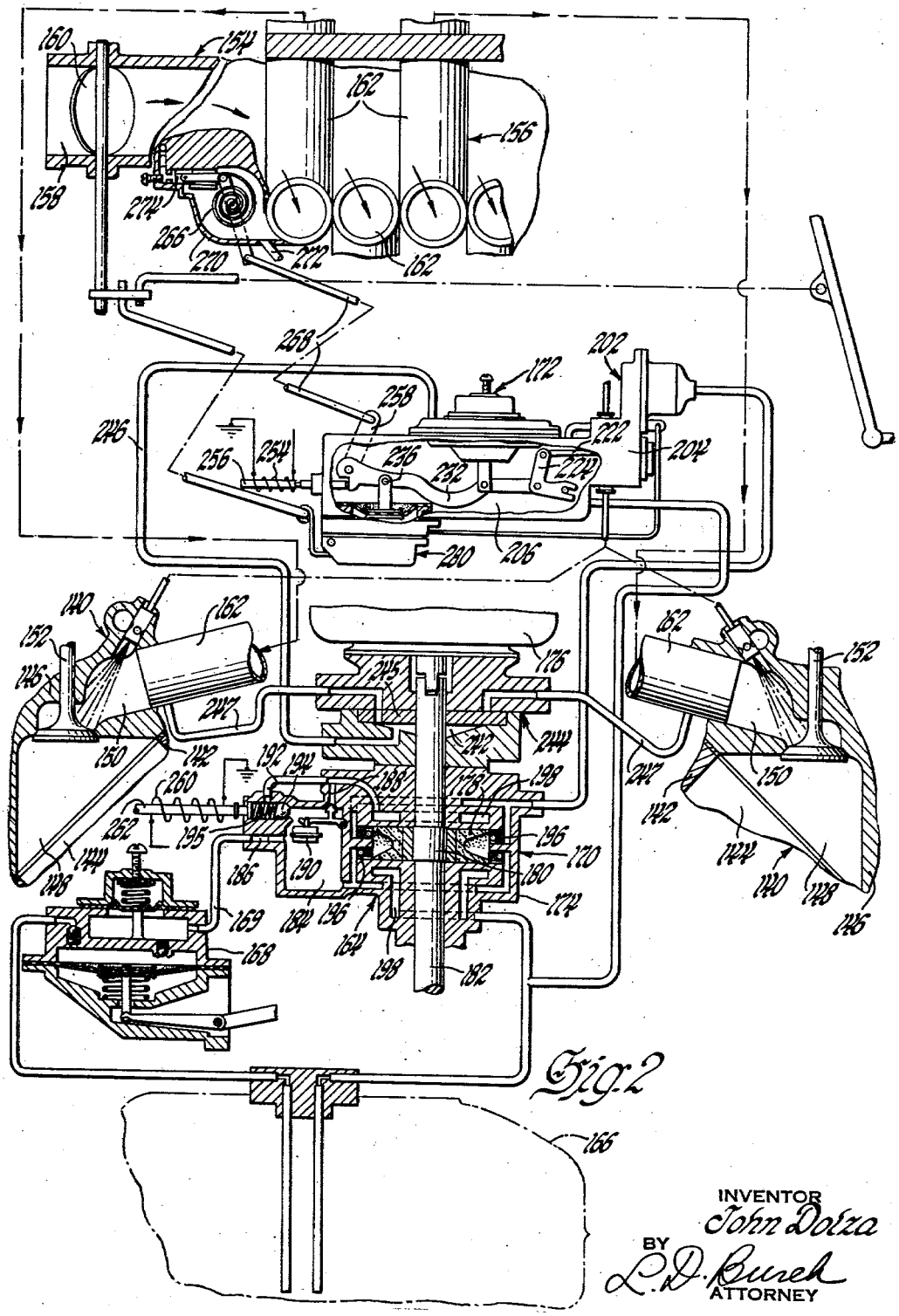
FIGURE 2 is a view similar to FIGURE 1 but showing another embodiment of the present invention.

The embodiment illustrated in FIGURES 2 and 3 is very similar to the embodiment in FIGURE 1, the fuel being metered in essentially the same manner. This embodiment is also adapted to be installed on a V-type engine 140 having a cylinder block 142 with a pair of angularly disposed banks of cylinders 144. Cylinder heads 146 are secured to the sides of the block 142 to close the upper ends of the cylinders 144 and form combustion chamber 148. Intake passages 150 may extend through the cylinder heads 146 and open into the combustion chambers 148 for supplying a suitable charge thereto. The flow of this charge into the combustion chambers 148 may be controlled by intake valves 152 actuated by a camshaft (not shown).

The induction system 154 which is substantially the same as in the first embodiment includes a plenum chamber 156 having an inlet 158 with a throttle valve 160 therein and a plurality of tubes or "ram pipes" 162 that interconnect the plenum chamber 156 with the intake passage 150. If desired, these "ram pipes" 162 may be tuned to resonate during some engine operating conditions so as to superchange the cylinder 144.

The fuel injection system 164 for forming the charge in the intake passages 150 includes a fuel storage tank 166, a supply or transfer pump 168, an injector or metering pump 170 and a control unit 172. The transfer pump 168 which may be driven by the engine 140 or any other suitable means is connected to the storage tank 166 and discharges a large volume of relatively low pressure fuel through the outlet 169. A diaphragm type of pump has been found suitable for this installation.

The injector or metering pump 170 which is similar to the metering pump in the first embodiment includes a housing 174 disposed below the ignition distributor 176 and containing a pair of pumping cells 178 radially disposed about an eccentric cam 180 on a driveshaft 182. The driveshaft 182 is driven from the camshaft and will thus operate in direct proportion to the speed of the engine 140. The pump housing 174 includes a separating chamber 184 having an inlet 186 thereto connected to the outlet of the transfer pump 168 for receiving the entire supply of fuel from the transfer pump 168. These pumping cells 178 preferably draw their supply of fuel through an opening in the bottom of the chamber 184 to thereby reduce the likelihood of vapors entering the pumping cells 178. The top of the chamber 184 may include a vent 188 controlled by a float 190 and a vent 192 controlled by a pressure check valve 194. Normally the float 190 will retain the vent 188 closed and the check valve 194 will thus maintain some predetermined pressure in the separating chamber 184. It should be noted that the check valve 194 has a spring 195 that will normally maintain a pressure which is inadequate to open the valves 196 in the metering pump 170 and force unmetered quantities of fuel to flow therethrough. In the event the amount of fuel in the separating chamber 184 becomes low, the float 190 will open the vent 188. When this occurs the transfer pump 168 can quickly fill the chamber 184 without opposition from the pressure normally maintained by the check valve 194, the air and vapors being forced through the vent 188. Thus even a low pressure transfer pump 168 may rapidly recharge the chamber 184 with fuel and also remove any vapors therefrom.

The transfer pump 168 is adapted to supply the chamber 184 with a considerable excess of fuel over the requirements of the engine. The surplus fuel and any vapors collected in the top of the chamber 184 will be flushed therefrom through the outlet 192 and into a cooling jacket 198 around the pump cells. This surplus fuel will have sufficient volume to absorb heat from the pumping cells 178 and cool them. In addition, the pressure of the spill fuel will be drastically reduced as it passes through the check valve 194. This will cause the formation of sufficient fuel vapors to actually produce a refrigerate effect on the pump cells 178.

The control unit 172, although functionally very similar to the control unit in the first embodiment, is somewhat different structurally. This control unit 172 includes a housing 202, one end of which contains a fuel section 204 and the other end of which encloses a linkage chamber 206.

The fuel section 204 includes a filtered inlet 208 having a supply passage 210 and a distributing chamber 212 with the inlet end 214 connected to the supply passage 210. The distributing chamber 212 includes a plurality of injector lines 215 that radiate from the middle thereof to terminate adjacent the intake valves 152 essentially identical to the first embodiment. The outlet end 216 of the distributing chamber 212 allows surplus fuel from the distributing chamber 212 to be by-passed into the pool 219 of spill fuel in the bottom of the linkage chamber 206 and drained through spill fuel line 217.

The inlet end 214 of the distributing chamber 212 and/or the supply passage 210 has an anti-percolation or check valve 218 that includes a valve member 220 biased closed by a coil spring. The spring tension is set to maintain a pressure sufficient to raise the boiling temperature of the fuel and eliminate vapor formation but still allow the fuel requirements to flow therethrough without necessitating a pump having excessively high pressure.

The outlet end 216 of the distributing chamber 212 includes an axially movable needle 222 in the orifice 223 that is effective to regulate the amount of fuel by-passed from the distributing chamber 212 into the pool 219 of spill fuel collected in the bottom of the linkage chamber 206 and drained through the spill fuel line 217. Thus by controlling the percentage of fuel by-passed from the distributing chamber 212, the needle 222 is effective to meter the amount of fuel distributed to the cylinders. The needle 222 is connected to one arm 221 of a bell crank 224 that pivots about a pin 226. The other arm 238 of the bell crank 224 is connected to a linkage 228 controlled by a diaphragm 230. This linkage 228 includes a floating beam 232 having one end 234 attached to an adjustable pivot 236, the other end connected to arm 238 of the bell crank 224 and the center 240 connected to the diaphragm 230 by a vertical link 241. It may thus be seen that the diaphragm 230 is effective to move the linkage and to insert or extract the needle 222 from the orifice 223 and thus regulate the fuel flow. The diaphragm 230 encloses a chamber 243 thereabove which is, in turn, connected with a chamber 242 in the sampling valve 244 by a conduit 246. The sampling valve 244 includes a rotary disk 245 that rotates with the driveshaft 182 and thus selectively interconnects the sampling lines 247 with the chamber 242 during corresponding portions of the cycles. A pair of springs 248 and 250 may be disposed on the opposite sides of the diaphragm 230 for biasing it into the correct position. The tensions of the springs 248 and 250 may be selected to match the injection system to the enigne employed. Adjustment of the screw 252 may be provided for regulating the air-fuel ratio of the resulting charge.

It may thus be seen that if the intake vacuum is high the sampling valve 244 will transmit a high vacuum signal to the diaphragm chamber 243. The diaphragm 230 will then pull on the vertical link 241 and raise the center of the beam 232. The beam then will swing about the pivot 236 and rotate the bell crank 224 clockwise. This will extract the needle 222 and increase the amount of spill fuel and thus decrease the flow of metered fuel to the cylinders. Conversely, if the diaphragm 230 is exposed to a small vacuum the diaphragm 230 will be lowered and force the needle 222 into the orifice 223, thereby increasing the fuel flow of metered fuel to the cylinders.

In order to eliminate difficulties in starting the engine it has been found desirable to provide a sufficient quantity of fuel during the starting operation to instantly prime the system and to insure each of the cylinders receiving an easily ignitable charge. It has been found that the air-fuel ratio of an easily ignitable charge is not critical as long as it is richer than some predetermined minimum and therefore it is not necessary to accurately meter the fuel during starting. In order to increase the fuel flow to the cylinders during the starting phase the needle 222 may be moved toward the closed position and/or an additional quantity of fuel may be pumped into the distributing chamber 212 so as to supplement the fuel supplied by the metering pump 170. One arrangement by which this may be accomplished is to provide a solenoid 254 connected to the starter circuit and including a reciprocating plunger 256. The end of this plunger 256 is positioned to engage the lever 258 when the solenoid 254 is energized. When the plunger 256 engages the lever 258 in this manner the lever 258 will be rotated counterclockwise and raise the pivot point 236. Raising the pivot point 236 causes the beam 232 to swing about the lower end of the vertical link 241 and rotate the bell crank 224 in a clockwise direction. This forces the needle 222 into the orifice 223 and increases the fuel flow to the cylinders. It should be noted that by extending the plunger far enough the pivot 236 will be raised enough to completely close the outlet 216 irrespective of the position of the diaphragm 230. This, in turn, will cause all of the fuel in the distributing chamber 212 to be distributed to the cylinders.

In addition to or as an alternative for the first arrangement a second solenoid 260 may also be connected to the starter circuit. When this solenoid 260 is energized a plunger 262 compresses the spring in the relief valve 194 in the vent 192 from the separating chamber 184. By compressing the spring 195 the pressure in the separating chamber 184 will be increased until the pressure is great enough to open the inlet and outlet valves 196 in the pumping cells 178 and cause fuel to flow therethrough. Thus the transfer pump 168 will override the metering pump 170 and force unmetered quantities of fuel through the metering pump 170 and into the distributing chamber 212. Consequently, a surplus of fuel will be delivered to the distributing chamber 212 for distribution to the cylinders. It should be noted that this arrangement, in addition to charging the cylinders, will prime the system and also rapidly flush any accumulated vapors therefrom.

It has been found that when the transfer pump 168 forces fuel through the valves 196 in the metering pump 170, the distributing chamber 212 and the injector lines 215, a considerable pressure is required. If in addition to this pressure, the transfer pump 168 has to overcome the pressure drop produced by the spring loaded anti-percolation valve 218 in some installations this may necessitate a comparatively high pressure in the output of the transfer pump 168. Therefore in order to eliminate the pressure drop from the anti-percolation valve 218 and thereby reduce the output pressure of the transfer pump and therefore the expense thereof, the anti-percolation valve 218 may be opened by means other than the fuel pressure. Thus a linkage 264 interconnected with the plunger 262 of solenoid 260 may open the anti-percolation valve 218 and allow the fuel to flow therethrough without any appreciable pressure drop. Thus whenever the starter is energized the transfer pump 168 can easily force fuel through the entire system.

Once the engine 140 has fired and is running under its own power it is no longer advantageous to supply the unmetered quantities of fuel that were desirable during starting. However, if the engine 140 is operating at subnormal temperatures, it may be desired to provide a slightly richer charge than would otherwise be supplied by the normal metering action until the engine has reached its normal operating temperatures. Accordingly, it has been found desirable to provide means for altering the position of the needle during this period. One way to accomplish this is to provide means for changing the position of the pivot 236 during cold operation. This will not interfere with the metering action of the diaphragm 230 but it will increase the richness of the charge. Although the pivot 236 may be moved by any suitable means, in the present instance a thermostatic spring 266 is provided which has one end thereof connected to a push rod 268 attached to the lever 258. This spring 266 is disposed in a housing 270 heated by any suitable means such as heated air flowing from a stove in heat exchanging relation with the engine exhaust through tube 272. A pneumatic piston 274 may be connected to the spring 266 to adjust the tension in response to the engine's intake vacuum and also to cause a forced draft of the heated air from the stove through the housing 270. Thus when the engine 140 is cold the spring 266 will raise the pivot point 236 and thereby increase the richness of the charge. The action of the diaphragm 230 etc., will continue to meter the fuel according to the air consumed by the engine 140 but due to the raised pivot 236 the charge will be slightly richer. Once the spring 266 has become heated and relaxed its tension, the pivot point 236 will return to its normal position. Thus the action of the diaphragm 230 will produce the normal charge.

Although when employing an injection system of this nature an accelerator pump 280 has not been found necessary, in some engines 140 it may be desired to temporarily enrich the mixture during periods of high acceleration. Accordingly, under such circumstances an accelerator pump 280 may be provided. In the present instance the the accelerator pump 280 includes a pair of diaphragms 282 and 284 that form a pair of chambers 286 and 288 separated from each other by a rigid imperforate partition 290. The lower chamber 288 is connected to the spill fuel chamber 206 by an inlet passage 292 having a one-way valve 293 therein and an outlet passage 296 that discharges back into the spill fuel chamber 206. The upper chamber 286 includes an inlet 294 connected to the outlet 296 from the bottom chamber 288. The center of the lower diaphragm 284 is connected to the throttle valve 160 by a link 298 that will raise and lower the diaphragm 284 simultaneously with opening and closing of the throttle valve 160 respectively. Thus when the throttle valve 160 closes the diaphragm 284 will be lowered and the lower chamber 288 will be filled with spill fuel flowing through the inlet 294. When the throttle valve 160 is opened the diaphragm 284 will rise. This will close the inlet valve and force the fuel in the lower chamber 288 to be discharged through the outlet 296. In the event the throttle valve 160 opens slowly the fuel flow through the outlet 296 will be low and the weight of the valve 299 will retain it open, thereby allowing the fuel to flow past the valve 299 and be returned to the spill fuel chamber 206 without affecting the position of the upper diaphragm 282. However, in the event the throttle valve 160 is suddenly opened the fuel will be very rapidly discharged through the outlet 296. This will cause the valve 299 to rise against the upper seat 300 and restrict the fuel flow therepast. Consequently, the fuel leaving the lower chamber 288 will flow into the upper chamber 286 and raise the upper diaphragm 284. This movement of the diaphragm 284 will raise the pivot point 236 and thereby force the needle 222 toward the closed position. Thus even though the usual metering action of the diaphragm 230 etc., will continue to regulate the fuel flow the raised pivot 236 will tend to increase the amount of metered fuel flow and thereby enrichen the charge. The fuel in the upper chamber 286 will tend to leak through the valve 299 and gradually allow the diaphragm 284 to return to its original position, thereby restoring the charge to its usual proportions.

When the engine 140 has been driving a load and the throttle valve 160 is suddenly closed, the momentum of the load will overrun and drive the engine 140 with the fuel distributed to the various cylinders performing no useful work and being wasted. In addition, since the throttle valve 160 will be closed at such times, the intake vacuum will be very high and there will be incomplete burning of the fuel and a large amount of unburned hydrocarbons, etc., may appear in the exhaust gases. Accordingly, it has been found desirable to increase the fuel economy by eliminating the fuel flow to the cylinders during overrunning conditions. In an injection system of this nature this may be accomplished by disrupting the fuel flow in any suitable manner; for example, by employing a shut-off valve 302 connected to the branch passage 210 in the fuel section. Although the shut-off valve 302 may be opened by any suitable means it has been found that when the throtle 160 is closed and the load is overrunning the engine 140, the intake vacuum will be extremely high; in fact, it will be even higher than the idle vacuum. Accordingly, a diaphragm 304 is interconnected with the intake vacuum by a tube 306 and a spring 308 retains the valve 302 in a closed position. However, the spring tension is low enough so that when the vacuum is above idle vacuum, the diaphragm 304 will compress the spring 308 and open the valve 302. During normal operation this valve 302 remains completely closed. Thus all of the fuel passing through the branch passage 210 flows into the distributing chamber 212 However, when the engine 140 is being overrun the high intake vacuum opens the valve 302 and allows the fuel in the branch passage 210 to pass into the spill fuel chamber 206. The anti-percolation valve 218 will normaly require so much pressure to open it that the entire supply of fuel will be diverted through the open valve and into the spill fuel chamber, thus entirely eliminating any fuel flow to the engine during the overrunning condition.

It is to be understood that although the invention has been described with specific reference to particular embodiments thereof, it is not to be so limited since changes and alterations therein may be made which are within the full intended scope of this invention as defined by the appended claims.

The claims:

1. A fuel injection system for an internal combustion engine having a plurality of cylinders and an induction system for charging said cylinders, said fuel injection system comprising a pump interconnected with a source of fuel and having an outlet for discharging fuel therefrom, a housing having a substantially cylindrical distributing chamber wherein with an inlet at one end and an outlet at the other end, said inlet being interconnected with the outlet of said pump and said outlet having a by-pass valve therein adapted to by-pass fuel from said distributing chamber to said source of fuel, separate injector lines for each of said cylinders for discharging the fuel into the charges for the cylinders, the inner ends of said lines intersecting said distributing chamber radially to the axis in a common plane at circumferentially spaced equal points, means responsive to the quantity of air consumed by said engine and effective for actuating said by-pass fuel and thus meter the fuel flow through said injector lines to said cylinders.

2. A fuel injection system for an internal combustion engine having a plurality of cylinders and an induction system for charging said cylinders, said injection system comprising a pump interconnected with a source of fuel and having an outlet for discharging fuel therefrom, distributing means including a distributing chamber interconnected with the outlet of said pump, a by-pass valve communicating with said distributing chamber and being adapted to control the amount of fuel by-passed from said distributing chamber to said fuel source, separate outlets from said chamber for each of said cylinders circumferentially spaced around said chamber for discharging metered quantities of fuel into the charges for the cylinders, pressure responsive means sensitive to the pressure of the air in the induction system for actuating said by-pass valve and causing a metered quantity of fuel to be distributed through said separate outlets to said cylinders.

3. A fuel injection system for an engine comprising a plurality of cylinders and an induction system for charging said cylinders, said injection system comprising a pump interconnected with a source of fuel, said pump having an outlet for discharging fuel therefrom in proportion to the speed of said engine, a housing having a cylindrical distributing chamber therein one end of which is interconnected with the outlet of said pump and the other end of which includes an axially movable needle valve adapted to regulate the quantity of fuel by-passed from said distributing chamber to said source of fuel, separate injector lines for each of said cylinders interconnected with said distributing chamber at circumferentially equally spaced points for discharging metered quantities of fuel into the charges for the cylinders, pressure responsive means sensitive to the pressure of the air in said induction system for positioning said needle valve and thus metering the quantity of fuel to said cylinders in proportion to the quantity of air flowing through the engine.

4. A fuel injection system for an engine comprising a plurality of cylinders and an induction system for charging said cylinders, said injection system comprising a pump interconnected with a source of fuel, said pump having an outlet for discharging fuel therefrom in proportion to the speed of said engine, a housing having a distributing chamber therein, one end of which is interconnected with the outlet of said pump and the other end of which includes a valve adapted to regulate the quantity of fuel by-passed from said distributing chamber to said source of fuel, separate injector lines for each of said cylinders having the inner ends thereof interconnected with said distributing chamber at circumferentially equally spaced points, the outer ends of said injector lines including nozzles for discharging metered fuel into the charges for said cylinders, each of said nozzles including a metering orifice having hydraulic resistances considerably greater than the resistances of said injector lines, pressure responsive means sensitive to the pressure of the air in said induction system for positioning said valve for metering the quantity of fuel to said cylinders in proportion to the quantity of air flowing through said engine.

5. A fuel injection system for an engine comprising a plurality of cylinders and an induction system having separate induction passages for charging said cylinders, said injection system comprising a pump interconnected with a source of fuel, said pump having an outlet for discharging fuel therefrom in proportion to the speed of said engine, a housing having a cylindrical distributing chamber therein, one end of which is interconnected with the outlet of said pump and the other end of which includes a valve adapted to regulate the quantity of fuel by-passed from said distributing chamber to said source of fuel, separate injector lines for each of said induction passages having the inner ends thereof interconnected with said distributing chamber at circumferentially equally spaced points, the outer ends of said injector lines including substantially identical nozzles for discharging metered quantities of fuel into the charges for said cylinders, each of said nozzles being disposed in an envelope of substantially atmospheric air and having a hydraulic resistance considerably greater than the resistance of said injector lines, pressure responsive means sensitive to the pressure of the air in said induction system for positioning said valve and thereby metering the quantity of fuel to said cylinders in proportion to the quantity of air flowing through said engine.

6. A fuel injection system for an internal combustion engine having a plurality of cylinders and an induction system with induction passages for charging said cylinders, said injection system comprising a fuel pump connected with a source of fuel and having an outlet for discharging fuel therefrom, means for selectively sampling the amount of air flow through at least one of said induction passages during at least a portion of the cycles of air flow in said intake passages, a metering mechanism having pressure responsive means therein operatively interconnected with said means and being effective to meter said fuel in proportion to the average of said amounts, means for distributing equal increments of fuel to the individual cylinders.

7. A fuel injection system for an internal combustion engine having a plurality of cylinders and an induction system including a plurality of induction passages for charging said cylinders, said injection system comprising a fuel pump communicating with a source of fuel and having an outlet for discharging fuel therefrom, a metering mechanism adapted to meter the fuel flow from said pump to said cylinders, means for selectively sampling the amounts of air flowing through said intake passages and transmitting a signal proportional thereto to said metering mechanism and causing said mechanism to meter the fuel flow in proportion to said signal.

8. A fuel injection system for an internal combustion engine having a plurality of cylinders and an induction system including a plurality of induction passages for charging said cylinders, said induction passages being adapted to resonate during at least one engine operating condition, said injection system comprising a fuel pump having an outlet for discharging fuel under pressure therefrom, a metering mechanism having means therein adapted to meter the flow of fuel to said cylinders, means for selectively sampling the amounts of air in said intake passages and transmitting a signal proportional thereto to said first means for causing said mechanism to meter the fuel flow in proportion thereto.

9. In an internal combustion engine having a plurality of cylinders, the combination of an induction system including a plenum chamber with a throttle valve in the inlet and a plurality of induction passages for charging said cylinders, said induction passages being adapted to resonate during at least one engine operating condition and a fuel injection system comprising a source of pressurized fuel and means for selectively sampling the amounts of air flowing through said induction passages for actuating a metering mechanism effective to meter the flow of fuel to said cylinders in proportion to said amounts.

10. A fuel injection system for an internal combustion engine having a plurality of cylinders and an induction system with a plenum chamber having a throttle valve inlet and a plurality of induction passages for charging said cylinders, said injection system comprising a fuel pump communicating with a source of fuel and having an outlet for discharging fuel therefrom in proportion to the speed of said engine, a metering mechanism having pressure responsive means therein adapted to meter the flow of fuel to said cylinders, means for selectively sampling the pressures of the air flowing through said induction passages and transmitting a signal proportional to the amounts of air pressure to said pressure responsive means for causing said mechanism to meter the fuel flow in proportion thereto.

11. A fuel injection system for an internal combustion engine having a plurality of cylinders and an induction system including a plurality of intake passages for charging said cylinders, said intake passages being adapted to resonate during at least one engine operating condition, said injection system comprising a fuel pump communicating with a source of fuel and having an outlet for discharging fuel therefrom as a function of the engine speed, a metering mechanism having pressure responsive means therein adapted to meter the fuel flow from said pump to said cylinders by by-passing surplus fuel to the inlet of said pump, means for selectively sampling the air pressure in said intake passages during some limited portions of corresponding fragments of the cycles of air flow in said induction passages and transmitting the resultant signal to said pressure responsive means so that said mechanism will regulate the amount of by-passed fuel and thereby meter the fuel flow in proportion to said signal.

12. A fuel injection system for an internal combustion engine having a plurality of cylinders and an induction system including a plurality of intake passages for charging said cylinders, said intake passages being adapted to resonate during at least one engine operating condition, said injection system comprising a fuel pump communicating with a source of fuel and having an outlet for discharging fuel therefrom, a distributing chamber having a plurality of injector lines radiating therefrom for distributing equal increments of metered fuel to the charges of said cylinders, one end of said distributing chamber being connected to said pump outlet and the other end thereof having a by-pass valve for by-passing fuel from said distributing chamber to thereby meter the amount of fuel flowing through said injector lines to said charges, means for selectively sampling the amounts of air flowing through said intake passages and producing a signal proportional to said amounts, means responsive to said signal for actuating said by-pass valve and metering said fuel in proportion thereto.

13. A fuel injection system for an internal combustion engine having a plurality of cylinders and an induction system including a plurality of induction passages for charging said cylinders, said induction passages adapted to resonate during at least one engine operating condition for dynamically supercharging said cylinders, said injection system comprising a fuel pump driven by said engine and having an outlet for discharging fuel therefrom in some predetermined proportion to the speed of said engine, a distributing chamber having a plurality of injector lines adapted to distribute equal increments of metered fuel to the charges for said cylinders, said distributing chamber having one end thereof connected to said outlet and the other end thereof including a by-pass valve for by-passing fuel from said chamber to said source, pressure responsive means adapted to actuate said by-pass valve for regulating the amount of fuel by-passed from said distributing chamber to said fuel source for thereby metering the quantity of fuel distributed to the charges for said cylinders, means for selectively sampling the pressure of the air in said intake passages and transmitting a pressure signal proportional to said amounts to said pressure responsive means so that said pressure responsive means will meter said fuel distributed to said cylinders in proportion to the air pressure in said intake passages.

14. Charge forming means for an internal combustion engine comprising an induction system having a plenum chamber with a throttle valve in the inlet and a plurality of intake passages for said cylinders adapted to resonate during some engine operating conditions for dynamically supercharging said cylinders and an injection system comprising a metering mechanism connected to a pump for metering the flow of fuel to the charge for said cylinders and a sampling valve actuated in timed relation to said engine for selectively interconnecting said metering mechanism with said intake passages during some predetermined proportions of the cycle of the air flowing therethrough for metering said fuel in proportion to the air pressures therein.

15. An internal combustion engine comprising a plurality of cylinders, induction passages for charging said cylinders, said induction passages being adapted to resonate during one or more engine operating conditions for dynamically supercharging said cylinders, a fuel pump connected with a source of fuel and having an outlet for discharging fuel therefrom, a metering mechanism connected to said outlet and having pressure responsive means therein adapted to meter the flow of fuel to the charge for said cylinders, a sampling valve actuated in time relation to said engine for selectively interconnecting said pressure responsive means with said induction passages during some predetermined portions of the cycles of the air flowing therethrough, and means for distributing said metered fuel in equal increments to the charges for said cylinders.

16. An internal combustion engine comprising a plurality of cylinders, an induction system including a plurality of induction passages for charging said cylinders, said induction passages being adapted to resonate during one or more engine operating conditions for dynamically supercharging said cylinders, a fuel pump connected with a source of fuel and having an outlet for discharging fuel in proportion to the speed of said engine, a distributing chamber having a plurality of injection lines adapted to distribute equal increments of metered fuel to the charges for said cylinders, one end of said distributing chamber being connected to the outlet for said pump, the other end of said distributing chamber having a by-pass valve therein adapted to by-pass fuel from said distributing chamber to said source of fuel, a sampling valve actuated in timed relation to said engine for selectively sampling the pressure of the air in said intake passages during some predetermined proportions of the cycles of the air flowing therethrough to produce a signal proportional thereto, means responsive to said signal for actuating said by-pass valve in proportion thereto so as to meter said fuel in response thereto.

17. A fuel injection system for an internal combustion engine having a plurality of cylinders and an induction system for charging said cylinders, said injection system comprising first and second pumps connected in series, a distributor connected to the outlet of said second pump for distributing equal increments of fuel to said cylinders, said distributor being effective for metering said distributed fuel in proportion to the air flowing through said induction system by by-passing the surplus fuel from said distributor, an enrichment device operatively interconnecting the output of said first pump with said distributor means during only certain operating conditions to supply a supplementary quantity of fuel thereto, said device being effective during said conditions to override the normal metering action of said distributor to temporarily increase the richness of the charge.

18. A fuel injection system for an internal combustion engine having a plurality of cylinders and an induction system for charging said cylinders, said injection system comprising a fuel pump connected to a source of fuel and having an outlet for discharging fuel therefrom, a distributor connected to said pump outlet for distributing equal increments of fuel to said cylinders, a valve communicating with said distributor and being effective to meter the amount of distributed fuel by by-passing the surplus amount of fuel from said distributor for return to said pump, means responsive to the quantity of air flowing through said induction system, a linkage interconnecting said means with said valve for positioning said valve to meter said fuel in proportion to said air flow, an enrichment device affective during certain engine operating conditions to modify the action of said linkage on said valve to thereby modify the normal metering action of said means to change the air-fuel ratio of the charge during certain engine operating conditions.

19. A fuel injection system for an internal combustion engine having a plurality of cylinders and an induction system for charging said cylinders, said injection system comprising a fuel pump connected to a source of fuel and having an outlet for discharging fuel therefrom, a distributing chamber having one end thereof connected to said pump outlet, a plurality of injector lines radiating from said chamber for distributing equal increments of fuel to said cylinders, a valve communicating with the other end of said distributing chamber and being effective to meter the amount of distributed fuel by by-passing the surplus amount of fuel from said distributor to said pump, means responsive to the quantity of air flowing through said induction system, a linkage interconnecting said means with said valve for actuating said valve in proportion to said air flow, an enrichment device effective during only certain engine operating conditions to modify the action of said linkage to modify the air-fuel ratio of the charge during certain engine operating conditions.

20. A fuel injection system for an internal combustion engine having a plurality of cylinders and an induction system for charging said cylinders, said injection system comprising a fuel pump connected to a source of fuel and having an outlet for discharging fuel therefrom, a distributor connected to said pump outlet for distributing equal increments of fuel to said cylinders, a valve communicating with said distributor and being effective to meter the amount of distributed fuel by by-passing the surplus amount of fuel from said distributor, means responsive to a pressure indicative of the quantity of air flowing through said induction system, a linkage operatively inter-connecting said means with said valve for actuating said valve in proportion to said pressure, an enrichment device affective during only certain engine operating conditions to modify the action of said linkage to thereby modify the proportions of the air-fuel ratio and enrichen the charge during said conditions.

21. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the charges for said cylinders, means responsive to the amount of air in said induction system, a by-pass valve effective to meter the amount of fuel distributed by regulating the amount of fuel by-passed, a linkage operatively interconnecting said means with said valve and including an adjustable fulcrum, and an enrichment device operative to adjust the position of said fulcrum.

22. A fuel injection system for an internal combustion engine having a plurality of cylinders and an injection system for charging said cylinders, said injection system comprising a pump having an output proportional to the speed of said engine, a distributing chamber having one end thereof connected to the outlet of said pump and having a plurality of injector lines radiating therefrom for distributing equal increments of fuel to the charges for said cylinders, a by-pass valve effective to meter the amount of fuel distributed by regulating the amount of fuel by-passed, pressure responsive means adapted to sense the pressure of the air in said induction system, a linkage operatively interconnecting said pressure responsive means with said by-pass valve and including an adjustable fulcrum, and an enrichment device operative to adjust the position of said fulcrum during certain engine operating conditions.

23. A fuel injection system for an internal combustion engine having a plurality of cylinders and an induction system for charging said cylinders, said injection system comprising a pump having an outlet for discharging the fuel therefrom in proportion to the speed of said engine, a distributing chamber having one end thereof interconnected with the outlet of said pump and a plurality of injector lines radiating therefrom for distributing equal increments of fuel to the charges for said cylinders, a by-pass valve in the other end of said distributing chamber effective to meter the amount of fuel distributed to said cylinders by regulating the amount of fuel by-passed, a diaphragm responsive to the air pressure in said induction system, a linkage operatively interconnecting said diaphragm with said by-pass valve, said linkage including an adjustable fulcrum, and an enrichment device operative only during certain engine operating conditions to change the position of said fulcrum and thereby vary the proportions of the charge during said conditions.

24. A fuel injection system for an internal combustion engine having a plurality of cylinders and an induction system for charging said cylinders, said injection system comprising a pump having an outlet for discharging fuel therefrom in proportion to the speed of said engine, a distributing chamber having the inlet end thereof connected to the outlet of said pump and including a plurality of injector lines radiating therefrom for distributing equal increments of fuel to the charges for said cylinders, a by-pass valve in the other end of said distributing chamber effective to meter the amount of fuel distributed through said injector lines to said cylinders by regulating the amount of fuel by-passed from said chamber, a diaphragm responsive to the pressure of the air in said induction system, a linkage including a beam swinging about an adjustable fulcrum for operatively interconnecting said diaphragm with said valve, an enrichment device operative during certain engine operating conditions for adjusting the position of said fulcrum and thereby changing the proportions of said charge.

25. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the changes for said cylinders, a by-pass valve in the other end of said distributing chamber effective to meter the amount of fuel distributed through said injector lines to said cylinders by regulating the amount of fuel by-pased from said distributing chamber, a diaphragm responsive to the pressure of air in said induction system, a walking beam having at least three mounting points thereon, one of said mounting points being operatively interconnected with said diaphragm, another of said mounting points being operatively interconnected with said by-pass valve and another of said points forming an adjustable fulcrum, and an enrichment device operatively interconnected with said last mentioned points to adjust the position of said fulcrum to thereby modify the proportions of said charge during certain engine operating conditions.

26. A fuel injection sytem for an internal combustion engine having a plurality of cylinders and an induction system for charging said cylinders, said injection system comprising first and second pumps connected in series, a distributing chamber connected to the outlet of said second pump for distributing equal increments of fuel to said cylinders, metering means being effective to meter the amount of fuel distributed from said chamber to said cylinders in proportion to the air flowing through said induction system, a starting enrichment device effective to operatively interconnect the output of said first pump with said distributing chamber during only the starting operation of said engine to supply a supplementary quantity of fuel thereto for temporarily increasing the richnes of the resultant charge.

27. A fuel injection system for an internal combustion engine having a plurality of cylinders and an induction system for charging said cylinders, said injection system comprising a comparatively high volume pump, a comparatively high pressure pump interconnected with the outlet of said first pump for discharging fuel therefrom, a distributor connected to the outlet of said second pump for distributing equal increments of fuel to said cylinders, said distributor being effective for metering and distributing fuel in proportion to the air flowing through said induction system by by-passing the surplus fuel from said distributor, a starting enrichment device effective during the starting of said engine to operatively interconnect the outlet of said high volume pump with said distributor to thereby temporarily supply a supplementary quantity of fuel to said distributing chamber.

28. A fuel injection system for an internal combustion engine having a plurality of cylinders and an induction system for charging said cylinders, said injection system comprising a high volume pump, a high pressure pump connected in series with said second pump and having an output of fuel substantially proportional to the speed of said engine, a distributor connected to the outlet of said second pump for distributing equal increments of fuel to said cylinders, said distributor being responsive to the pressure of the air pressure in said induction system and being effective for metering said distributed fuel in proportion to the quantity of air flowing through said induction system by by-passing surplus fuel from said distributor, a starting enrichment devices effective during only the starting operation of said engine to operatively interconnect the output of said high volume pump with said distributor for temporarily supplying a supplementary quantity of fuel to said chamber during the starting operation to thereby increase the richness of the charge.

29. A fuel injection system for an internal combustion engine having a plurality of cylinders and an induction system for charging said cylinders, said injection system comprising a first pump having an outlet for discharging comparatively large quantities of fuel therefrom, a second pump interconnected with the outlet of said first pump and having an outlet for discharging fuel under a comparatively high pressure, a distributor connected to the outlet of said second pump for distributing equal increments of fuel to said cylinders, the inlet to said distributor including a pressure relief valve for maintaining the output pressure of said second pump above the pressure in said distributing chamber, a by-pass valve in said distributing chamber for metering said distributed fuel in proportion to the quantity of air flow through said induction system by by-passing the surplus fuel from said distributor, a starting enrichment device effective during only the starting operation of said engine to operatively interconnect the output of said high volume pump with said distributor posterior to said pressure relief valve to thereby supply a supplementary quantity of fuel to said distributing chamber during said starting operation to thereby temporarily increase the richness of the charge.

30. A fuel injection system for an internal combustion engine having a plurality of cylinders and an induction system for charging said cylinders, said injection system comprising a first pump having an outlet for discharging a large quantity of fuel therefrom, a second pump interconnected with said outlet and having another outlet adapted to discharge fuel therefrom in proportion to the speed of said engine, a distributor connected to the outlet of said second pump, a plurality of injector lines radiating from said distributor for distributing equal increments of fuel to said cylinders, the inlet of said distributor including a pressure relief valve for maintaining the output pressure of said second pump above the pressure in said distributing chamber, a by-pass valve in the outlet end of said distributor effective for metering the quantity of said distributed fuel by by-passing the surplus quantity of fuel from said distributor, means responsive to the pressure of the air in said induction system and being effective for actuating said by-pass valve in proportion thereto, a starting enrichment device effective during the starting operation of said engine to operatively interconnect the output of said first pump with said distributor posterior to said relief valve to thereby supply a supplementary quantity of fuel to said distributor so as to temporarily increase the richness of the charge.

31. A fuel injection system for an internal combustion engine having a plurality of cylinders and an induction system for charging said cylinders, said injection system comprising a fuel pump having an outlet for discharging fuel under pressure therefrom, a distributor connected to said pump outlet for distributing equal increments of fuel to said cylinders, a valve for metering the quantity of said distributed fuel by by-passing at least a portion of the output of fuel from said pump, means responsive to the quantity of air flowing through said engine for actuating said valve to thereby control the volume of by-passed fuel and thus meter the fuel flowing from said distributor to said cylinders, a starting enrichment device effective during only the starting operation of said engine to move said valve towards the closed position to thereby override the normal metering action and thereby temporarily increase the proportion of fuel distributed from said distributor to said cylinders.

32. A fuel injection system for an internal combustion engine having a plurality of cylinders and an induction system for charging said cylinders, said injection system comprising a first pump having an outlet for discharging a large quantity of fuel therefrom, a second pump interconnected with said first outlet and having a second outlet for discharging fuel under high pressure therefrom, a distributor connected to said second outlet and having a plurality of injector lines extending therefrom for distributing equal increments of fuel to said cylinders, a by-pass valve in said distributor responsive to the quantity of air flowing through said engine and being effective for by-passing at least a portion of the fuel therefrom to thereby meter the quantity of fuel distributed to said cylinders in proportion to the quantity of air flowing through said engine, a starting enrichment device effective during the starting operation of said engine to temporarily interconnect the output of said first pump with said distributing chamber to thereby supply a supplementary quantity of fuel thereto and to also simultaneously bias and by-pass valve towards the closed position to thereby increase the proportion of fuel distributed to said cylinders.

33. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the charges for said cylinders, means responsive to the amount of air in said induction system, a by-pass valve effective to meter the amount of fuel distributed to said cylinders by regulating the amount of fuel by-passed from said chamber, a linkage operatively interconnecting said means with said by-pass valve and including an adjustable fulcrum, a thermostatic means responsive to the temperature of said engine and being adapted to move said fulcrum whenever the temperature of said engine is below normal to thereby increase the amount of fuel distributed to said engine.

34. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the charges for said cylinders, a by-pass valve in the other end of said distributing chamber effective to meter the amount of fuel distributed through said injector lines to said cylinders by regulating the amount of fuel by-passed from said distributing chamber, a diaphragm responsive to the pressure of the air in said induction system, a walking beam having at least three mounting points thereon, one of said mounting points being operatively interconnected with said diaphragm, another of said mounting points being operatively interconnected with said by-pass valve, and an enrichment device including a thermostatic member responsive to the temperature of said engine and being operatively interconnected with another of said mounting points to adjust the position thereof for modifying the proportions of said charge when the temperature of said engine is below normal.

35. A fuel injection system for an internal combustion engine having a plurality of cylinders and an induction system for charging said cylinders, said injection system comprising a distributing chamber having one end thereof connected to a source of pressurized fuel and a plurality of injector lines radiating therefrom for distributing equal increments of fuel to the charges for said cylinders, a by-pass valve in said distributing chamber operatively interconnected with means responsive to the amount of air in said induction system and effective to regulate the amount of fuel by-passed through said valve to thereby meter the amount of fuel flowing through said injector lines, an accelerator pump comprising an accumulator communicating directly with said distributing chamber for discharging fuel into said distributing chamber for enriching said charge, means responsive to the vacuum in said induction system and being operatively interconnected with said accumulator to retain said accumulator inactive during the normal range of vacuums in said induction system.

36. A fuel injection system for an internal combustion engine having a plurality of cylinders and an induction system for charging said cylinders, said injection system comprising a fuel distributing chamber having one end thereof connected to a source of pressurized fuel and a plurality of injector lines radiating therefrom for distributing equal increments of fuel to the charges for said cylinders, a by-pass valve in the other end of said distributing chamber effective to meter the amount of fuel distributed to said cylinders by regulating the amount of fuel by-passed from said distributing chamber, means responsive to the amount of air in said induction system for actuating said valve in response thereto, a fuel shut-off device disposed in parallel with said distributing chamber and said by-pass valve for allowing the entire supply of pressurized fuel from said source to be returned to said source for eliminating distribution of fuel to said cylinders.

37. A fuel injection system for an internal combustion engine having a plurality of cylinders and an induction system for charging said cylinders, said injection system comprising a pump having an outlet for discharging fuel therefrom, a distributing chamber having one end thereof connected to said outlet and having a plurality of injector lines radiating therefrom for distributing equal increments of fuel to the charges for said cylinders, a by-pass valve effective to meter the amount of fuel distributed to said cylinders by regulating the amount of fuel by-passed from said chamber, means adapted to sense the amount of air flowing through said engine and actuating said by-pass valve in proportion thereto, a normally closed fuel cut-off device interconnected with the outlet of said pump and being disposed in parallel with said by-pass valve, said device being responsive to the pressure of the air in said induction system so as to open during abnormally high induction vacuums to divert the fuel from said distributing chamber to eliminate any fuel distribution to said cylinders.

38. A fuel injection system for an internal combustion engine having a plurality of cylinders and an induction system for charging said cylinders, said injection system comprising a fuel pump connected to a source of fuel and having an outlet for discharging fuel therefrom, a distributor connected to said outlet and having a plurality of injector lines radiating therefrom for distributing equal increments of fuel to said cylinders, the inlet of said distributor including a pressure relief valve for maintaining the outlet pressure of said pump above the pressure in said distributing chamber, a by-pass valve in the outlet end of said distributor effective for metering the quantity of said distributing fuel by by-passing the surplus quantity of fuel from said distributor, means responsive to the volume of air entering said engine for actuating said by-pass valve in response thereto, a fuel cut-off device interconnected with the output of said pump anterior to said pressure relief valve for diverting the fuel therefrom to said source, said device being normally closed but being responsive to the pressure of the air in said induction system so as to open during abnormally high induction vacuums for diverting the entire supply of fuel to said source so as to eliminate distribution of any fuel to the engine cylinders.

39. A fuel injection system for an internal combustion engine comprising a fuel pump adapted to discharge fuel under pressure therefrom, a distributing chamber connected to said pump outlet for distributing equal increments of fuel to the cylinders of said engine, a bypass valve in said distributing chamber adapted to meter the fuel flow to the cylinders of said engine by bypassing the surplus fuel for return to said pump, means responsive to the fuel demands of said engine for exerting an actuating force on said valve to meter the volume of distributed fuel in some predetermined proportion to the charge, a lever having one end thereof operatively interconnected with enrichment means and the other end effective to exert a supplementary force on said valve effective to temporarily modify said actuating force and said proportion.

40. A fuel injection system for an internal combustion engine comprising a fuel pump adapted to discharge fuel under pressure therefrom, a distributing chamber connected to said pump outlet for distributing equal increments of fuel to the cylinders of said engine, a bypass valve in said distributing chamber adapted to meter the fuel flow to the cylinders of said engine by bypassing the surplus fuel for return to said pump, means responsive to the fuel demands of said engine for exerting an actuating force on said valve to meter the volume of distributed fuel in some predetermined proportion to the charge, an accelerator pump and the other end interconnected with said bypass valve, said accelerator pump being actuated by the throttle for said engine to exert a force on said lever to close said valve.

41. A fuel injection system for an internal combustion engine comprising a fuel pump adapted to discharge fuel under pressure therefrom, a distributing chamber connected to said pump outlet for distributing equal increments of fuel to the cylinders of said engine, a bypass valve in said distributing chamber adapted to meter the fuel flow to the cylinders of said engine by bypassing the surplus fuel for return to said pump, means responsive to the fuel demands of said engine for exerting an actuating force on said valve to meter the volume of distributed fuel in some predetermined proportion to the charge, a thermostatic member, a lever having one end connected to said thermostatic member and the other end interconnected with said bypass valve, said member being responsive to the temperature of said engine to exert a force on said lever to close said valve.

42. In an engine having a plurality of cylinders and intake passages for charging said cylinders and an injection system for injecting metered quantities of fuel into said passages, a sampling valve comprising a stationary housing having a passage extending axially therethrough with portions of different diameters separated by a shoulder, a plurality of sampling chambers adapted to be interconnected with said intake passages and disposed around said axial passage, said chambers forming a series of circumferentially spaced openings in said shoulder, a rotor having one side thereof supported by said shoulder and being driven by said engine in timed relation to the operation thereof, a pressure chamber disposed on the other side of said rotor and being operatively interconnected with a control unit in said injection system, said rotor including a passage for intermittently interconnecting said sampling chambers with said pressure chamber to produce a resultant signal therein proportional to the flow through said intake passages and being effective to actuate said control unit in response thereto.

43. In a multicylinder engine having an induction system with a plurality of intake passages that communicate with the engine cylinders and that are adapted to resonate during one or more engine operating conditions, a fuel injection system comprising means for injecting fuel into said intake passages adjacent said cylinders, a control unit for metering the quantity of said injected fuel and a pressure sampling valve comprising a stationary member having a plurality of sampling chambers interconnected with said intake passages and a rotor adapted to be driven in timed relation to the operation of said engine for individually interconnecting said sampling chambers with a common pressure chamber operatively interconnected with said control unit so as to produce a resultant signal indicative of the individual flows for actuating said unit in response thereto.

44. A fuel injection system for a multicylinder, internal combustion engine having separate intake passages for said cylinders, said injection system comprising a plurality of injector nozzles communicating with said intake passages for injecting metered quantities of fuel into said intake passages, a control unit operatively interconnected with said injector nozzle and being effective to meter the quantity of the injected fuel delivered thereto, a sampling valve having a pressure chamber interconnected with said control unit and having a rotor driven in timed relation with the operation of said engine to intermittently interconnect said intake passages with said pressure chamber to form a resultant signal effective to actuate said unit in response thereto.

45. In an internal combustion engine having a plurality of cylinders and an induction system for charging said cylinders with a combustible charge of air and fuel, a fuel injection system for injecting metered quantities of fuel into the charges for said cylinders, said fuel injection system including a pump driven by said engine and having an output proportional to the speed of said engine, a distributor interconnected with said pump outlet for distributing equal increments of fuel to said cylinders, a bypass valve in said distributor effective to meter the quantity of said distributed fuel by bypassing the surplus fuel from said distributor for return to said pump, a pressure responsive member adapted to sense the pressure of the air in said induction system to exert a force on said bypass valve to thereby meter said fuel in some predetermined proportion to said charge, a lever mounted on a fixed pivot and having one end thereof connected to said valve for exerting a second force thereon, enrichment means connected to the other end of said lever for controlling the amount of said second force on said valve to change the proportions of said charge, said enrichment means including means responsive to the temperature of said engine for increasing said second force when said temperature is below normal.

46. In an internal combustion engine having a plurality of cylinders and an induction system for charging said cylinders with a combustible charge of air and fuel, a fuel injection system for injecting metered quantities of fuel into the charges for said cylinders, said fuel injection system including a pump driven by said engine and having an output proportional to the speed of said engine, a distributor interconnected with said pump outlet for distributing equal increments of fuel to said cylinders, a bypass valve in said distributor effective to meter the quantity of said distributed fuel by bypassing the surplus fuel from said distributor for return to said pump, a pressure responsive member adapted to sense the pressure of the air in said induction system exert a force on said bypass valve to thereby meter said fuel in some predetermined proportion to said charge, a lever mounted on a fixed pivot and having one end thereof connected to said valve for exerting a second force thereon, enrichment means connected to the other end of said lever for controlling the amount of said second force on said valve to change the proportions of said charge, said enrichment means including means responsive to opening movement of the throttle valve for said engine to increase said second force when said throttle valve is opened.

References Cited by the Examiner
UNITED STATES PATENTS

| | | | |
|---|---|---|---|
| 1,662,040 | 3/28 | Lee | 123—28 |
| 1,802,848 | 4/31 | Summers. | |
| 2,136,959 | 11/38 | Winfield. | |
| 2,165,447 | 7/39 | Browne | 261—66 |
| 2,448,131 | 8/48 | Williams et al. | 123—119 |
| 2,456,605 | 12/48 | Wirth et al. | 123—119 |
| 2,482,956 | 9/49 | Wirth et al. | 123—119 |
| 2,511,213 | 6/50 | Leslie. | |
| 2,563,939 | 8/51 | Kishline | 123—119 |
| 2,642,855 | 6/53 | Vanni. | |
| 2,673,556 | 3/54 | Reggio. | |
| 2,725,861 | 12/55 | Leibing | 123—119 |
| 2,857,145 | 10/58 | Morris. | |

RICHARD B. WILKINSON, *Primary Examiner.*

KARL J. ALBRECHT, RALPH H. BRAUNER,
*Examiners.*